United States Patent [19]
Casari et al.

[11] Patent Number: 5,126,908
[45] Date of Patent: Jun. 30, 1992

[54] VIDEO CASSETTE CONVERSION TOOL

[76] Inventors: Derek A. Casari, 15477 Dickens St., Sherman Oaks, Calif. 91403; H. Jay Levine, 11540½ Morrison St., No. Hollywood, Calif. 91601

[21] Appl. No.: 608,176

[22] Filed: Oct. 31, 1990

[51] Int. Cl.⁵ .............................................. G11B 33/00
[52] U.S. Cl. ...................................................... 360/137
[58] Field of Search ................................. 360/137, 132

[56] References Cited
U.S. PATENT DOCUMENTS
4,466,024  8/1984  Liu ........................................ 360/137

Primary Examiner—Robert S. Tupper
Attorney, Agent, or Firm—Roger A. Marrs

[57] ABSTRACT

A conversion tool is disclosed herein for modifying a video cassette so that it will be accepted for playback by a special video recorder which includes a base plate with a pedestal in a critical corner location mounting a manually operated drill wherein the drill tip projects through the plate projecting from the undersurface thereof for a predetermined distance. The undersurface includes a plurality of guide posts depending therefrom against which a conventional video cassette is located in order to receive the drill tip. An identification hole is made in the cassette housing for subsequent sensing by mechanism in the video recorder.

7 Claims, 1 Drawing Sheet

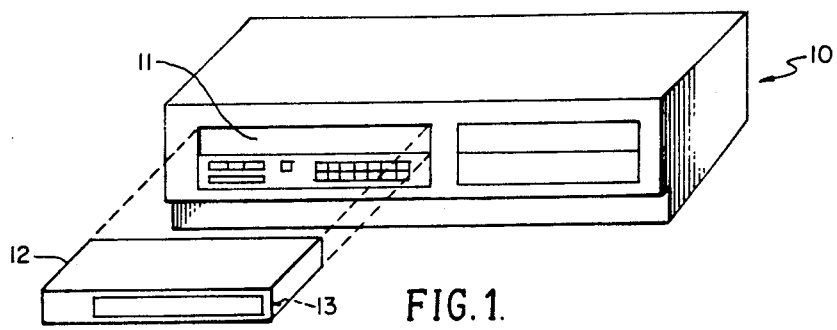
FIG. 1.
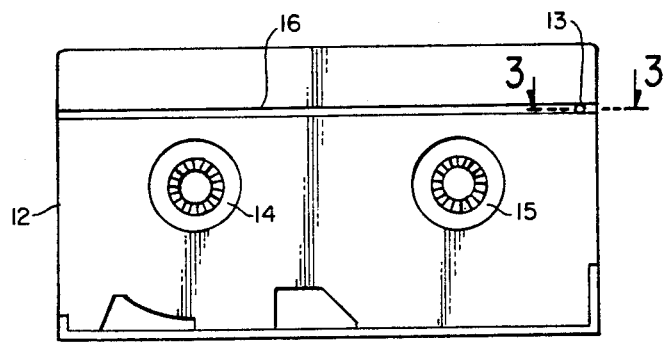
FIG. 2.
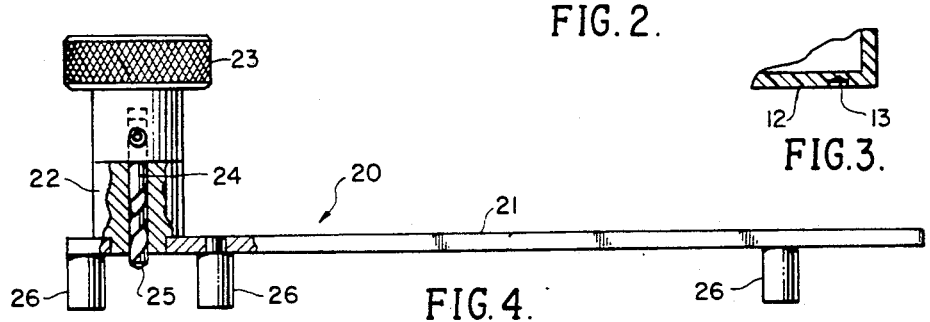
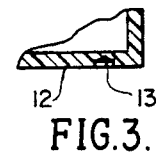
FIG. 3.
FIG. 4.
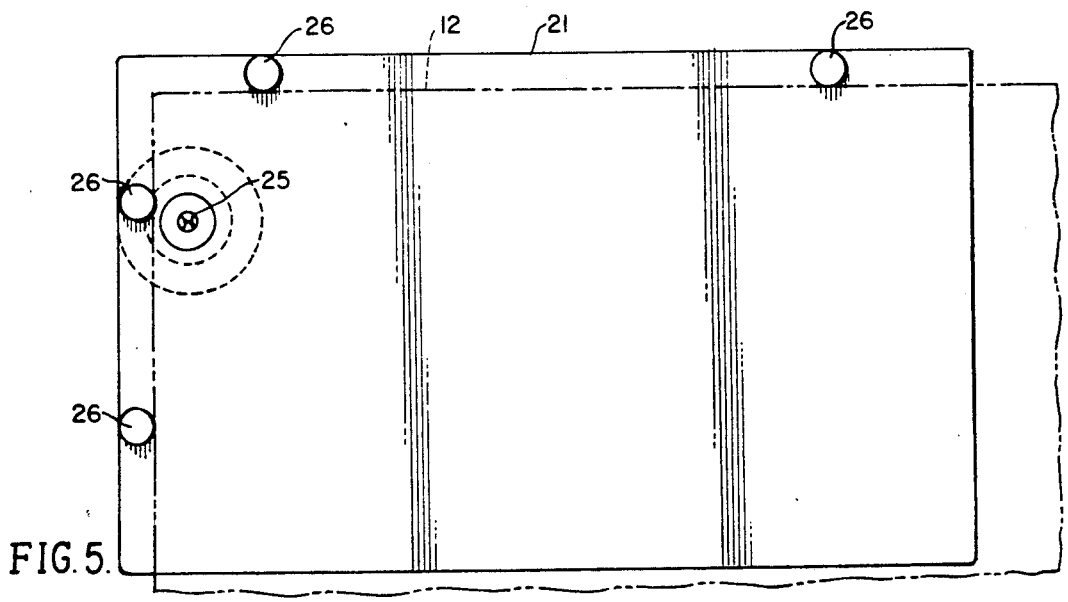
FIG. 5.

VIDEO CASSETTE CONVERSION TOOL

BACKGROUND OF THE INVENTION

1. Field of the Invention

The present invention relates to the field of conversion tools and more particularly to a novel tool adapted to convert a conventional video tape cassette with an identification hole so that it will be readily received into a special video recorder for subsequent playback or recording purposes.

2. Brief Description of the Prior Art

It has been the conventional practice to employ a video tape cassette for playback and recording purposes in connection with a video recorder. In this connection, video tape is produced in a variety of qualities pertaining to such characteristics as fidelity, resolution or the like and depending on the quality of the tape, a price is established. Obviously, the higher quality magnetic tape used in the cassettes carries the higher price and is deemed the most desirable. Also in this connection, video recorders have been produced which will accept only higher grade or quality magnetic tape cassettes which renders the lower grade or quality video cassettes useless for these recorders. In most instances, the lower grade video tape is still acceptable to most persons using the recorder so that the difference between the low and the high quality tape is minimal.

Therefore, a long-standing need has existed to provide a means for converting a lower quality tape cassette so that it will be received for playback or recording purposes in such a specialized recorder as described above. Such a means for modifying the conventional video tape cassette of lower quality must be a tool which is readily available for use by unskilled persons and by persons who need not require additional equipment or special knowledge.

SUMMARY OF THE INVENTION

Accordingly, the above problems and difficulties are obviated by the present invention which provides a novel conversion tool for modifying a conventional or standard video tape cassette so that it will be received into a special video recorder commonly referred to as a VCR. The tool of the present invention comprises a flat plate of an overall square or rectangular configuration having several corners. At a selected corner, a pedestal is fixedly carried for mounting a rotatable drill bit including a knob attached to one end of the bit for manual turning by the user. The opposite end of the drill bit extends through a passageway in the pedestal and projects beneath the undersurface of the plate for a critical distance. A plurality of guide means are provided on the undersurface of the plate adapted to abuttingly engage with the edges of the standard video tape cassette housing whereby an identification hole may be drilled into the housing by the drill bit upon rotation thereof by the user. The identification hole is critically placed in the cassette housing and the guide means, as well as the pedestal mounting of the drill bit, provide for proper indexing and alignment of the drill tip so that the identification hole is properly located.

Therefore, it is among the primary objects of the present invention to provide a novel conversion tool for modifying a standard video tape cassette so that the standard cassette carrying low quality magnetic tape may be readily received into a special VCR intended to only receive cassettes holding high quality video tape.

Another object of the present invention is to provide a novel tool for indexing and aligning a manually operated drill bit with respect to the housing of a standard video cassette so that a locator or identification hole may be properly placed in the housing of the cassette for subsequent sensing and identification by mechanism within a special video cassette recorder Another object of the present invention is to provide a novel conversion tool which is of low cost and which may readily be used by unskilled persons without special equipment for modifying a standard cassette holding video tape of low quality so that the cassette may be used in a special recorder intended only to use a cassette carrying magnetic tape of a higher quality.

Yet another object of the present invention is to provide a novel inexpensive converting tool for modifying a standard video cassette so that an identification opening or hole is provided on the external side of the cassette for subsequent sensing and identification by special VCR equipment.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a front perspective view showing a conventional video tape recorder adapted to receive a cassette carrying video tape;

FIG. 2 is an enlarged bottom view of the standard cassette shown in FIG. 1 after modification to include the identification hole;

FIG. 3 is an enlarged fragmentary view, in section, of the identification hole provided in the housing of the cassette as taken in the direction of arrows 3—3 of FIG. 2;

FIG. 4 is a side elevational view, partly in section, of the novel conversion tool used to modify the cassette housing shown in FIG. 2; and FIG. 5 is a bottom view of the conversion tool shown in FIG. 4.

DESCRIPTION OF THE PREFERRED EMBODIMENT

Referring to FIG. 1, a cassette recorder 10 is illustrated having a front slot 11 for insertably receiving a video cassette 12. The video cassette 12 houses a magnetic tape between a storage drum and a take-up drum (not shown). The quality of the magnetic tape within the cassette 12 is considered a low grade as compared to higher grade magnetic tapes in other types of cassettes. The recorder 10 is of a special design and construction so as to receive only cassettes holding higher grade or higher quality video magnetic tapes. Normally, it would be impossible for the conventional cassette having lower quality tape to be inserted into the recorder 10 for playback or recording purposes. The recorder 10 is programmed to reject cassettes having such low quality tape. However, by modifying the housing of the cassette 12 with an identification hole, as indicated by numeral 13, in the bottom of the cassette housing, the recorder 10 will permit insertion and usage of the magnetic tape for playback or recording purposes. Therefore, all magnetic tape cassettes of high quality will include a hole 13 in precise location so that it may be sensed within the recorder 10 for identification, classification or the like. Upon this determination, the video cassette 12 will either be accepted or rejected by the recorder 10.

The purpose of the conversion tool of the present invention is to place an identification hole 13 in the housing at a precise location of a video cassette having tape of a low quality so that such a tape will be accepted by the recorder 10.

Referring now in detail to FIG. 2, the video tape cassette 12 is viewed from its underside so as to display a storage reel 14 for the magnetic tape and a take-up reel 15 for the tape which is of a lower quality than is standard for the quality normally intended to be placed into the recorder 10. The housing the cassette 12 includes an elongated slot or channel 16 at the end of which is located the identification hole 13. Referring to FIG. 3, it can be seen that the hole 13 does not continue all the way through the thickness of the wall of the housing. Should the hole continue completely through the wall, residue of the sidewall as the hole is being drilled may fall into the interior which may clog or otherwise damage the mechanism or the tape itself. Once the cassette 12 has been inserted into the recorder 10, a sensing mechanism such as a probe or other type of sensor may be used to detect the identification hole.

Referring now to FIGS. 4 and 5, the novel conversion tool of the present invention is illustrated in the general direction of arrow 20 which includes a flat plate 21 of square or rectangular configuration. Along one end of the plate adjacent to a corner there is carried in fixed relationship to the plate, a pedestal 22 on which is mounted a turning knob 23. A drill bit 24 is carried by the knob and has a drill shank passing through a passageway in the pedestal so that a drill tip 25 extends under the plate 21. The tip 25 extends a critical distance away from the undersurface of plate 21 so that upon rotation during a drilling procedure, the tip will not proceed completely through the wall of the cassette housing as previously noted.

A plurality of guide means are carried on the underside of plate 21 and in the present illustration take the form of posts 25 and 26.

As shown in FIG. 5, the cassette 12 is placed adjacent to the underside of plate 21 and the peripheral edges of one side and one end of the cassette are placed against the external surfaces of the post 25 and the post 26 so that the cassette is in alignment with respect to the drill bit 25. Therefore, the guide means serves to properly align and index the cassette housing with the conversion tool during the drilling procedure so that the identification opening 15 is properly located in the housing of the cassette 12.

In view of the foregoing, it can be seen that by applying the tool of the present invention, the identification hole may be placed in the housing of a cassette holding tape of low quality so that it may be introduced and received by the recorder 10.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A video tape cassette conversion tool comprising the combination of:
   a flat plate having a critical locator area adjacent a peripheral edge;
   a pedestal secured to said plate at the edge marginal region on said locator area;
   a drill means rotatably carried on said pedestal having a drill bit with a tip extending beyond the undersurface of said plate; and
   guide means carried on said plate undersurface in a predetermined pattern so as to position a conventional video tape cassette with respect to said drill bit tip.

2. The invention as defined in claim 1 wherein:
said pedestal includes a central passage and said drill bit includes an elongated shank rotatably disposed in said passageway and coaxial therewith.

3. The invention as defined in claim 2 wherein:
said knob includes a knurled portion for grasping by the hands of the user.

4. The invention as defined in claim 3 wherein:
said guide means comprises a plurality of posts downwardly depending from the plate undersurface in fixed spaced-apart relationship along at least two edges of said plate.

5. The invention as defined in claim 4 wherein:
said guide posts are flat so as to be conformal with the flat sides of the video tape cassette.

6. The invention as defined in claim 5 wherein:
said drill bit tip is substantially flat so as to produce a flat bottom depression defining a locator opening.

7. The invention as defined in claim 6 wherein:
said locator opening is a depression having a flat bottom.

* * * * *